United States Patent [19]

Hosokawa et al.

[11] Patent Number: 5,716,133
[45] Date of Patent: Feb. 10, 1998

[54] SHIELDED HEAT SENSOR FOR MEASURING TEMPERATURE

[75] Inventors: Akihiro Hosokawa; Masahiko Kowaka, both of Cupertino, Calif.

[73] Assignee: Applied Komatsu Technology, Inc., Tokyo, Japan

[21] Appl. No.: 373,401

[22] Filed: Jan. 17, 1995

[51] Int. Cl.$^6$ .................................................. G01J 5/06
[52] U.S. Cl. ................................................................ 374/121
[58] Field of Search ........................... 374/4, 9, 110, 374/120, 121, 126, 131, 132, 135, 138, 179, 208; 250/353; 136/214

[56] References Cited

U.S. PATENT DOCUMENTS

| | | | |
|---|---|---|---|
| 919,399 | 4/1909 | Thwing | 136/214 |
| 3,016,412 | 1/1962 | Ross | 136/214 |
| 3,039,308 | 6/1962 | Shiba | 374/126 |
| 3,392,282 | 7/1968 | Astheimer | 374/126 |
| 3,969,943 | 7/1976 | Ohno et al. | 73/355 EM |
| 4,422,778 | 12/1983 | Shestopalov et al. | 374/4 |
| 4,549,162 | 10/1985 | Grimm | 374/138 |
| 4,560,973 | 12/1985 | Grimm et al. | 374/165 |
| 4,760,371 | 7/1988 | Don | 374/121 |
| 5,098,198 | 3/1992 | Nulman et al. | 374/126 |
| 5,106,200 | 4/1992 | Hosokawa . | |

FOREIGN PATENT DOCUMENTS

| | | | |
|---|---|---|---|
| 0612862 | 8/1994 | European Pat. Off. . | |
| 57-161521 | 10/1982 | Japan | 374/126 |
| 60-209158 | 10/1985 | Japan . | |
| 1-53120 | 3/1989 | Japan . | |
| 1-155220 | 6/1989 | Japan . | |
| 621882 | 4/1949 | United Kingdom | 374/126 |

OTHER PUBLICATIONS

Dahlke, G.P. et al., "Heat Focusing Shield in an Evaporation Chamber," *IBM Technical Disclosure Bulletin*, vol. 19, No. 4, Sep. 1976, p. 1252.

Watlow Series 988/989 User's Manual, p. 52, Sep. 1993, Watlow Chemicals, Winona, MN.

Omega Catalog, pp. A-9—A-10, A-31—A-32, date unavailable, Omega Engineering, Stanford, CT, prior to filing date of present application.

*Primary Examiner*—G. Bradley Bennett
*Attorney, Agent, or Firm*—Fish & Richardson P.C.

[57] ABSTRACT

A sensor for measuring the temperature of a workpiece including a substrate, wafer, shield or other element in a semiconductor processing system. In the illustrated embodiment, the sensor has a heat shield to reflect away from the heat sensing element, heat from unwanted sources such as susceptors and heating cartridges which can adversely affect the accuracy of the measurement. In addition, the heat shield preferably has a small thermal mass for improved responsivity.

20 Claims, 8 Drawing Sheets

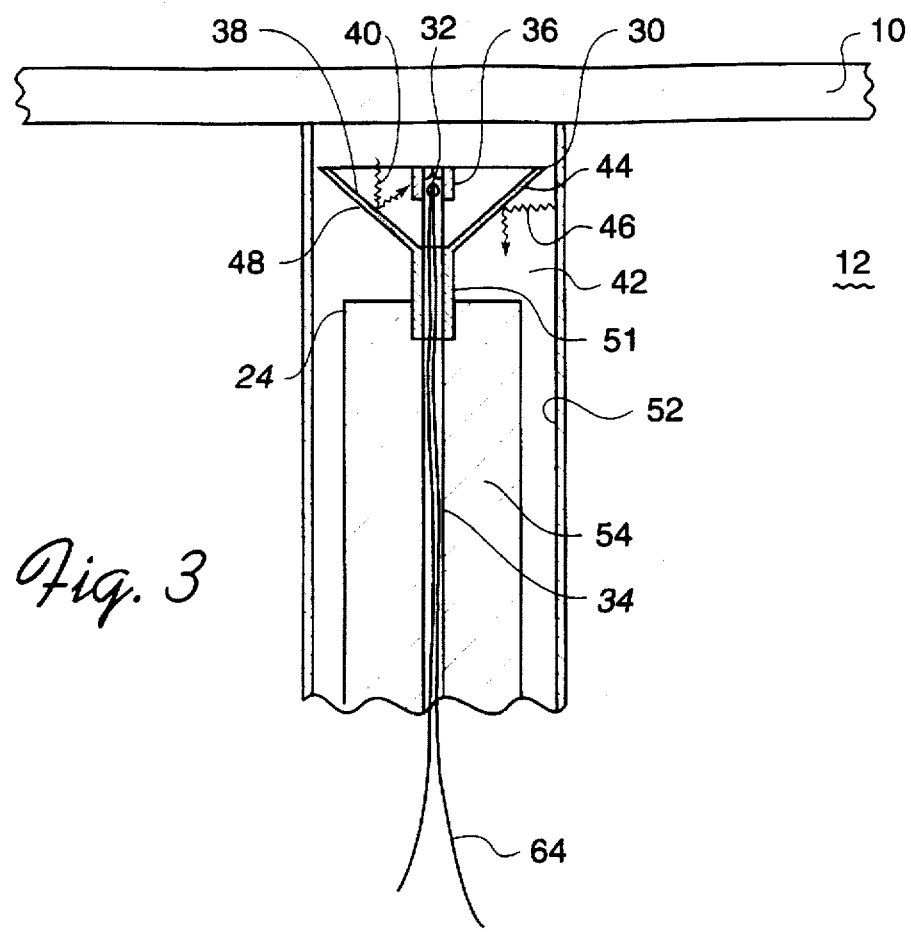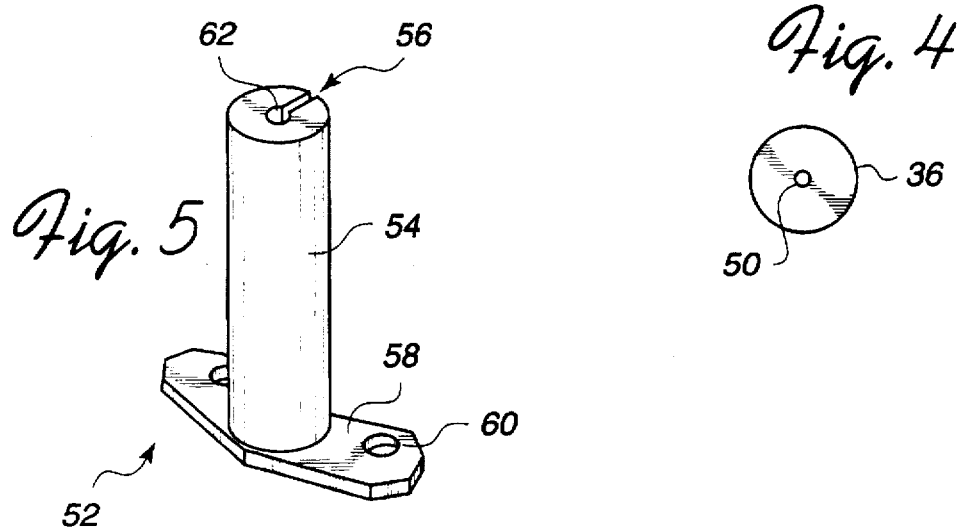

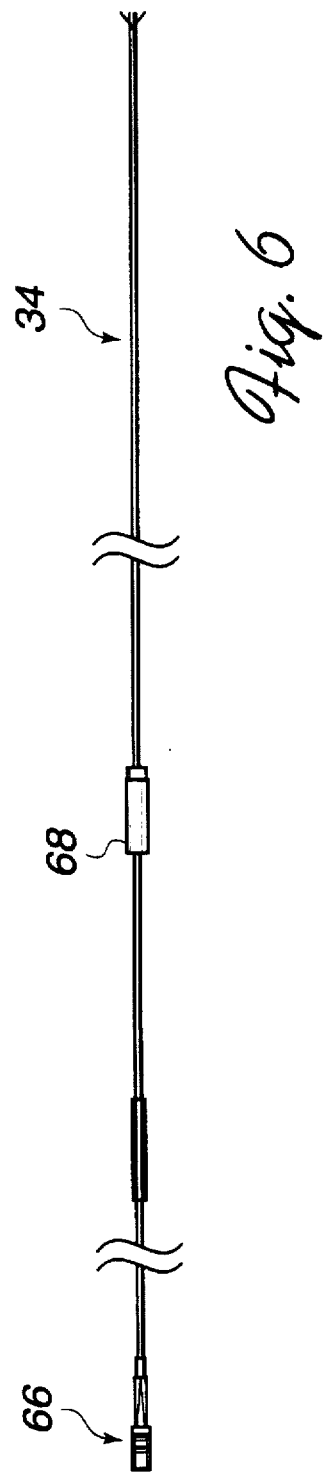
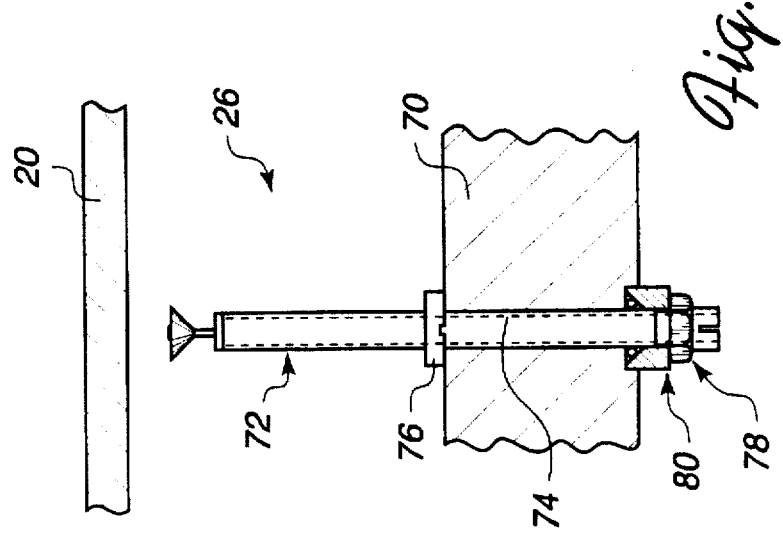

SHIELDED HEAT SENSOR FOR MEASURING TEMPERATURE

FIELD OF THE INVENTION

The present invention is directed to the fields of thin film deposition and other semiconductor processing systems.

BACKGROUND OF THE INVENTION

Modern liquid crystal displays, such as the active matrix liquid crystal displays used in some portable computers, are typically formed by the deposition of thin films on a glass substrate. These thin films are subsequently processed using standard photolithographic techniques to form the circuitry which drives the liquid crystal display. This circuitry typically includes amorphous silicon field effect transistors and is formed directly on the surface of the glass substrate to optimize the integration of these displays. Satisfactory performance of the resulting liquid crystal displays is often dependent on the uniformity of transistor characteristics across the surface of the glass substrate and on the level of performance exhibited by individual transistor elements. Satisfactory characteristics of thin films semiconductors, insulators and metals on glass substrates are in turn usually highly sensitive to the temperature of the glass deposition substrate. For example, the deposition temperature can strongly affect the mobility of carriers in deposited amorphous silicon films and thereby affect the performance of MOSFETs formed from the deposited amorphous silicon films. Accordingly, for many applications, it is important to maintain the deposition substrate at an appropriate temperature, as well as to maintain a uniform temperature across the surface of the deposition substrate.

In a vacuum deposition system, glass deposition substrates are typically loaded into a thin film deposition system through a vacuum load lock and a transfer chamber. Because of the sensitivity of the thin film deposition process to the temperature of the deposition substrate, a number of precautionary steps are often taken to ensure that the glass substrate is brought to the appropriate temperature before deposition begins. For example, after the glass substrates are admitted to the deposition system, the substrates are frequently heated in a preheat chamber until they reach a temperature near the target deposition temperature. Once the substrates have preheated to a sufficient degree, one of the substrates is transferred to the deposition chamber by a substrate transfer robot in preparation for thin film deposition. Even if the transfer operation is performed quickly, the glass substrate can cool markedly during the transfer operation. Thus, the substrate usually must be preheated again to ensure that the substrate has uniformly obtained the appropriate deposition temperature.

The duration of this second preheat step is often referred to as the "soak" time. The second preheat is performed by a susceptor which is a table-like structure with a built-in heater. The deposition substrate is preferably heated for a sufficient time to ensure that the deposited film will have the desired characteristics, otherwise there is a risk that devices formed using the deposited film will have poor or non-uniform performance characteristics. The soak time directly impacts the potential throughput of a given thin film deposition system because deposition usually does not take place during the soak time. It is therefore desirable to minimize the soak time so that the second preheat step takes only as long as is necessary to ensure that the substrate is at the appropriate temperature.

To improve efficiency, it is preferable to monitor the temperature of the deposition substrate in situ to establish when the deposition substrate has reached an appropriate deposition temperature. Also, it is highly desirable to monitor the temperature of the substrate during the deposition process. However, it has heretofore been very difficult to measure accurately the temperature of a substrate within the deposition chamber. For example, in the field of wafer processing, it is known to measure the temperature of the wafer by placing a heat sensor in direct contact with the wafer. Such direct contact methods are often undesirable in thin film processing systems because the contacting heat sensor tends to lower the temperature of the substrate at the point of contact. Not only can such a temperature change adversely affect the accuracy of the measurement, but the low temperature spot at the point of contact can cause a discontinuity in the deposited film.

To avoid contacting the substrate with the heat sensor, it has been proposed to measure the temperature of the susceptor on which the substrate rests in the deposition chamber. However, because the pressure in the deposition chamber is typically about 5 mTorr, there is usually too little gas convective heat transfer between the deposition substrate and the susceptor to keep the substrate and the susceptor in good thermal contact, notwithstanding the fact that the substrate is in physical contact with the susceptor. Thus, the temperature of the susceptor is usually a poor measure of the temperature of the deposition substrate.

Yet another approach has been to measure indirectly the temperature of a substrate by positioning a heat sensor in physical proximity to the substrate but spaced a predetermined distance from the surface of the substrate. While this approach avoids disrupting the temperature of the substrate and otherwise contaminating the substrate by contacting the substrate, the accuracy and speed of measurement by such non-contact type heat sensors have often been correspondingly reduced.

Still further, in thin film processing systems, it is usually impractical to position the heat sensor above the substrate since the heat sensor would likely interfere with the film deposition. As a consequence, the heat sensors have typically been installed on the susceptor underneath the substrate. As a result, the temperature measurements by the heat sensor are usually a function of not only the temperature of the substrate but the temperature of the susceptor as well. Since there can be substantial differences in the temperatures of the substrate and the susceptor (for example 200° and 250° C., respectively), the effects of the susceptor temperature can substantially reduce the accuracy of the substrate temperature measurement. Yet another problem associated with non-contact sensors is that there is often a time delay before a change in temperature can be detected. Thus, should there be a sudden change in the substrate temperature, the accuracy of the measurement can adversely affected.

U.S. Pat. No. 5,106,200 entitled "Apparatus For Measuring Temperature Wafer," assigned to the assignee of the present application and issued to one of the co-applicants of the present application, describes a non-contact apparatus for measuring the temperature of a wafer carried by a robot lifter. This patent, which is incorporated in its entirety by reference, discloses a heat sensor comprising a thermocouple having a heat collector which is capable of efficiently collecting radiant heat incident thereon. To improve the collection of heat by the heat collector, the heat sensor also has a heat reflector formed on a generally conical surface below the heat collector. It is disclosed that a ceramic material with a metal coating or metallic materials such as stainless steel may be used for this purpose. The ceramic material which has been coated to form the heat reflector serves the additional purpose of reducing or eliminating the thermal effects of the adjacent lifter on the thermocouple of the heat sensor. Although the heat sensor disclosed in this patent has both significantly improved accuracy and response time as compared to many prior non-contact type sensors, for many applications, even greater accuracy and response time would be highly beneficial.

Yet another non-contact type heat sensor used in wafer and thin film processing is the pyrometer which measures the temperature of a workpiece by sensing the infrared radiation emitted by the workpiece. U.S. patent application Ser. No. 08/021,840, entitled "Measuring Wafer Temperatures," and assigned to the assignee of the present invention, describes a pyrometry system in which a cavity is formed adjacent to the wafer whose temperature is to be measured. Blackbody radiation within this cavity is sampled to yield information about the temperature of the wafer. U.S. patent application Ser. No. 08/190,421, entitled "Optical Pyrometer for a Thin Film Deposition System," and assigned to the assignee of the present invention, describes a pyrometer in which the back side of the deposition substrate is viewed through a channel formed in the susceptor of the deposition system. Radiation from the back side of the deposition substrate passes through an infrared window and to an infrared detector. A tube-like light guide shields the infrared detector from the background radiation produced by the heated susceptor. Although such pyrometers can provide accurate measurements with satisfactory response times under appropriate circumstances, pyrometers tend to be relatively expensive, particularly as compared to thermocouple-type heat sensors. In addition, pyrometers are generally not well suited for temperature measurement during the deposition process since the plasma associated with the deposition often adversely affects the measurement.

SUMMARY OF THE PREFERRED EMBODIMENTS

In accordance with one aspect of the present invention, a device for measuring the temperature of a workpiece comprises a heat sensor element and a heat shield positioned to reflect, away from the heat sensor element of the device, heat emitted from sources other than the workpiece. In the illustrated embodiment, the heat shield is a thin-walled, generally conically shaped structure having a highly polished exterior surface which reflects heat away from a thermocouple positioned within the heat shield to measure the temperature of the workpiece. The highly reflective exterior surface reflects heat emitted from a susceptor or other non-workpiece source so as to minimize any adverse effect on the accuracy of the workpiece temperature measurement. In addition, because the heat shield has a thin-walled construction, the responsivity of the device is significantly improved.

In a preferred embodiment, the interior surface of the heat reflector is also highly polished so as to further improve the collection of heat emitted by the workpiece. It will be apparent from the following that polishing both the interior and exterior surfaces of the shield also minimizes the thermal interaction between the thermocouple and the shield and between the shield and the susceptor.

BRIEF DESCRIPTION OF THE DRAWINGS

FIG. 3 is a cross-sectional view of a heat sensor for the substrate of the chamber of FIG. 1.

FIG. 4 is a top view of the heat collector of the heat sensor of FIG. 3.

FIG. 5 is a perspective view of a support bracket for the heat sensor of FIG. 3.

FIG. 6 is a side view of the heat sensor of FIG. 3.

FIG. 7 is a side view of a heat sensor for the shield of the chamber of FIG. 1.

DETAILED DESCRIPTION OF THE PREFERRED EMBODIMENTS

Figure 1:
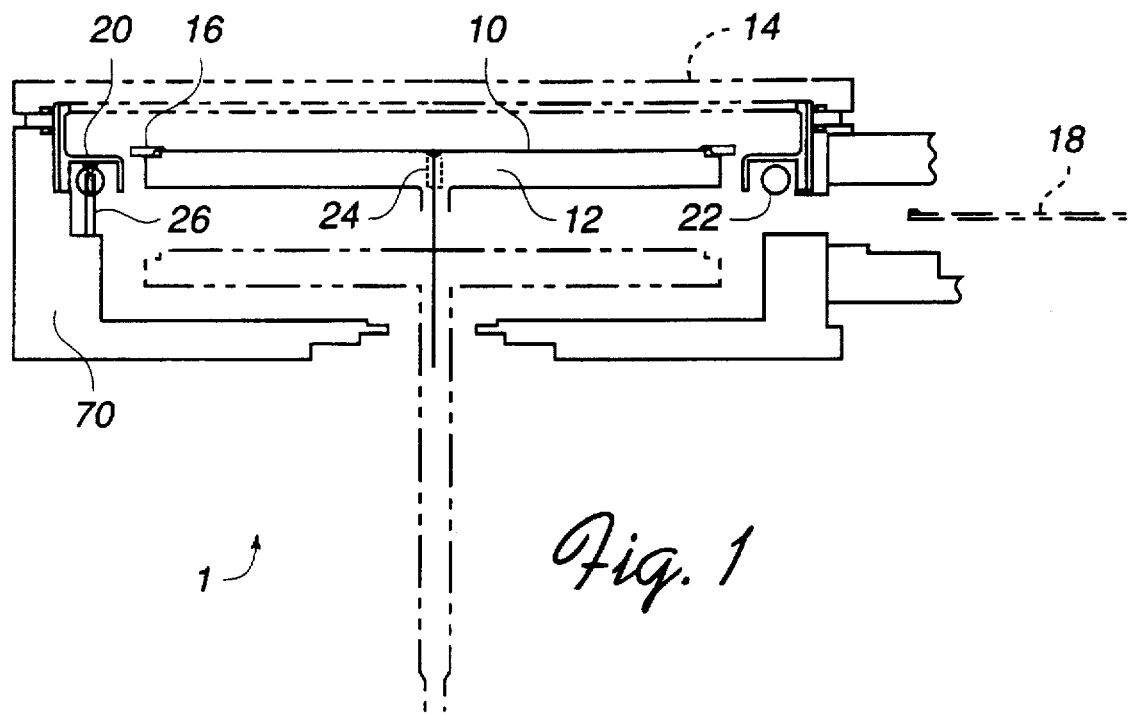
FIG. 1 is a schematic diagram of a processing chamber in accordance with a preferred embodiment of the present invention.
Figure 2:
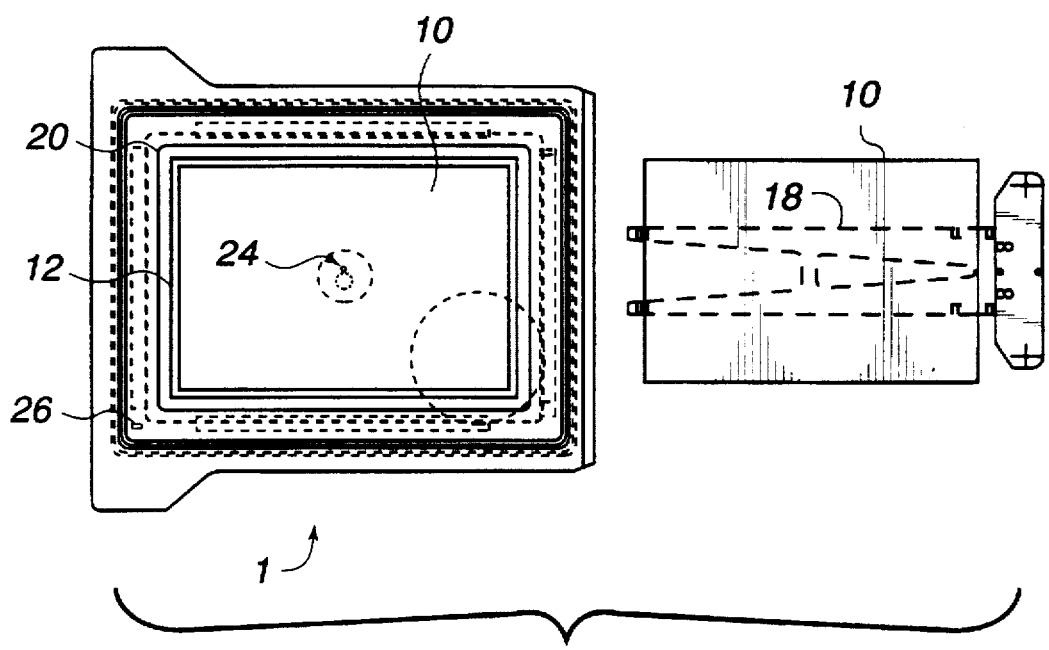
FIG. 2 is a top view of the chamber of FIG. 1.

A system in accordance with a preferred embodiment of the present invention is indicated generally at 1 in FIGS. 1 and 2. As will be explained in greater detail below, preferred embodiments utilize a heat sensor element for measuring the temperature of a workpiece and a heat shield to reflect away from the heat sensor element heat emitted by non-workpiece sources. Such an arrangement has been found to improve significantly the accuracy of the workpiece temperature measurement. In addition, the heat shield preferably has a thin-walled construction which has been found to improve significantly the responsivity of the sensor.

In the illustrated embodiment, the workpiece is a substrate 10 in a thin-film physical deposition (PVD) system. It is appreciated that the workpiece may also be a semiconductor wafer, a chamber shield or other element in any semiconductor processing system in which there is a need to measure the temperature of the element. Thus, although the illustrated embodiment is described in connection with a thin film deposition system, it should be appreciated that the present invention is also useful in wafer and other semiconductor processing systems.

The illustrated system 1 is configured so that a thin film is deposited on the deposition substrate 10 when it is disposed on the surface of a susceptor 12 and adjacent and parallel to a sputtering target plate 14. The deposition substrate 10 may be a piece of glass being processed to form a liquid crystal display device. During sputter deposition, a voltage is applied between the sputtering target plate 14 and the susceptor 12 and other parts of the chamber. The voltage is high enough to ionize a gas, usually argon, in the intervening space into a plasma, and the positively charged argon ions are accelerated toward the target plate 14 where they hit the target plate 14 at relatively high energies. A magnetic field generated by a magnet (not shown) behind the target plate 14 concentrates free electrons adjacent to the target plate 14 so as to allow a high-density plasma to be formed there. As a result of the collisions, free atoms or groups of ionized atoms of the target material are ejected from the surface of the target, essentially converting the target material to free atoms or molecules. Most of the free atoms which escape the target surface in the direction of the substrate, strike the substrate to form thin film layers on the substrate 10. Such a magnetron sputtering system is described in greater detail in copending U.S. applications Ser. Nos. 08/236,715, filed Apr. 29, 1994, entitled "Integrated Sputtering Target Assembly" and U. S. application Ser. Nos. 08/303,098, filed Sep. 8, 1994, entitled "Shield Configuration for Vacuum Chamber," which are incorporated in their entireties by reference. It is recognized that the temperature measuring systems of the present invention may be used with other physical vapor deposition (PVD) processes and other semiconductor processes including CVD and ETCH.

The thin film deposition system preferably employs a massive aluminum block as the susceptor 12 to heat the substrate 10 to an appropriate temperature for deposition to occur. A shadow frame 16 disposed around the periphery of the substrate 10 prevents the film from forming on the outer edges of the substrate 10. Preferably, the substrate 10 is heated to a deposition temperature of about 200° C. and the susceptor temperature is maintained at approximately 250° C. A shield 20 protecting the interior of the chamber, is also heated, to a temperature of approximately 300° C., by four cartridge heaters 22 which achieve a temperature of approximately 800° C.

In the course of operation, new deposition substrates 10 are transferred from a preheat chamber (not shown) to the susceptor 12 by a transfer robot 18. The temperature of the deposition substrate 10 falls as the substrate is transferred from the preheat chamber to the surface of the susceptor 12, and the deposition substrate 10 is preferably reheated to an appropriate temperature before deposition begins. In the illustrated embodiment, an improved temperature measurement system monitors the temperature of the deposition substrate 10 as well as the shield 20. As a result, the substrate and shield can reliably be heated to their respective appropriate temperatures before the deposition process begins.

Objects at room temperature, or at the moderately elevated temperatures at which the substrate 10 and susceptor 12 are maintained during thin film deposition, emit radiation primarily in the infrared region. In other words, both the deposition substrate 10 and the susceptor 12 will emit radiation having a continuous spectrum of wavelength, most of the energy of which lies within the infrared region.

The system illustrated by FIGS. 1 and 2 includes a first temperature sensor 24 disposed centrally within the susceptor 12 and spaced from the underside of the deposition substrate 10 for measuring the temperature of the substrate 10. In addition, the system has a second sensor 26 disposed between the ends of two cartridge heaters 22 and oriented towards the underside of the shield 20 (FIG. 1) to measure the temperature of the shield 20. The heat sensors 24 and 26 are disposed under the substrate 10 and the shield 20, respectively, to protect the sensors from the plasma formed between the substrate 10 and target 14 during the deposition process. Since the susceptor 12 is placed in direct physical contact with the underside of the substrate 10 to heat the substrate 10 before and during the deposition process, the susceptor 12 and the substrate heat sensor 24 are in close physical proximity. Similarly, the cartridge heaters 22, in order to properly heat the shield 20, are disposed close to the shield 20 and as a result are adjacent to the shield temperature sensor 26.

As noted above, the temperature of the susceptor 12 can be substantially higher than that of the substrate 10. As a consequence, heat emitted by the susceptor 12, if detected by the nearby substrate temperature sensor 24, can substantially adversely affect the accuracy of the temperature measurement of the substrate 10. In a similar manner, the higher temperature heat emitted by the cartridge heaters 22 adjacent to the shield temperature sensor 26 can adversely affect the accuracy of the shield temperature measurement.

Conversely, the temperature of the susceptor 12 may be substantially below that of the substrate 10. This temperature differential can also interfere with proper temperature measurement of the substrate 10.

In accordance with one aspect of the present invention, each of the temperature sensors 24, 26 has a heat reflective surface positioned to reflect unwanted heat away from the heat sensing element of the heat sensor. For example, as best seen in FIG. 3, the heat sensor 24 includes a generally conically shaped heat shield 30 disposed around a thermocouple junction 32 carried at one end of thermocouple leads 64 laid through protective thermocouple sheath 34. The end of the sheath 34 carrying the thermocouple junction 32 is received within an annular aperture of a heat collecting member 36. Heat (infrared radiation) emitted by the substrate 10 overlying the sensor 24 either impinges directly on the heat collector member 36 or is reflected by the inner surface 38 of the heat shield 30 onto the infrared absorptive heat collector member 36, to heat the heat collector member 36, as represented by heat ray 40.

The heat sensor 24 is received within a cylindrical hole 42 which passes through the susceptor 12. Because of the substantial temperature differential between the susceptor 12 and the substrate 10, the heat emitted by the susceptor 12 can adversely affect the temperature measurement of the substrate 10. To reduce the effect of the susceptor 12, in accordance with one aspect of the present invention, the heat shield 30 has a highly polished, mirror-like exterior surface 44 which reflects infrared radiation from the susceptor 12 away from the heat collector member 36 as represented by the heat ray 46. In addition, the heat shield 30 reduces the effect of heat transferred from the susceptor 12 by other media such as gases and plasma which may be in the chamber atmosphere between the cylindrical inner wall 42 of the susceptor 12 and the heat sensor 24. Still further, the shield 30 provides at least partial protection from RF and plasma noise during the thin film deposition process.

In accordance with another aspect of the present invention, the shield 30 has a very thin-walled construction. In the illustrated embodiment, the conically shaped wall 48 of the heat shield 30 has a thickness of preferably no more than approximately 0.008 inches (0.2 mm). Because of this thin-walled construction, the heat shield 30 has a very low thermal mass and thus equilibrates in a relatively short time. (A thickness of 0.4 mm should result in a correspondingly increased (double) response time.) Thus, once the substrate 10 is placed in the chamber, the heat sensor 24 can almost immediately (for example within less than a second) accurately measure the temperature of the substrate 10. In addition, the distance between the heat sensor 24 and the substrate 10 can be increased while maintaining sensor response times well within acceptable limits. For example, it has been found that the sensor 24 is able to measure accurately the temperature of the substrate 10 within less than one second even when the substrate 10 is displaced more than one inch from the sensor 24. In general, the thickness of the shield wall of the heat shield 30 should be as thin as possible to reduce the thermal mass of the heat shield as much as possible while maintaining sufficient structural integrity and without adversely affecting the heat shielding and RF and plasma noise shielding functions.

As previously mentioned, the exterior surface 44 of the shield 30 is preferably highly polished to a mirror-like finish to maximize the heat shielding function. In addition, in the illustrated embodiment, the interior surface 38 of the shield wall 48 within line of sight of the heat collector 36 is also highly polished to a mirror-like finish. In the illustrated embodiment, the heat shield 30 is formed from stainless steel and is first machined to a smoothness of 34 Ra. The shield surfaces 38 and 44 are then mechanically polished to an increased smoothness of 8 Ra. Finally, these surfaces are electropolished and chemically polished to a smoothness of 2 Ra so that the heat shield has a very shiny, mirror-like finish both inside and out. The fine polishing provides a high reflectivity for optical radiation at wavelengths near the peak of the Planck distribution for the temperature being measured, namely, within the infrared band near 5 μm for typical PVD substrate temperatures. Although the heat shield 30 has been described as being formed from a stainless steel material, it is recognized that other materials may be used. In general, it is preferred that highly reflective, low emissivity metals be utilized including aluminum, gold and silver. These highly reflective metals can be coated onto a shield formed of a different metal.

A polished surface not only reflects infrared radiation (heat), but it is important to note that the surface of a polished face also does not efficiently emit light. As a result, the outer polished surface increases the thermal isolation of the shield wall 48 from the susceptor. For example, if the inner surface 38 were polished but the outer surface 44 was not, the shield 30 would tend to equilibrate to the susceptor temperature. Since the polishing of the shield inner surface is not perfect, the shield would then affect the temperature of the heat sensor 24. On net, when the substrate is hotter than the susceptor, it is believed that there would be transport of heat from the shield to the susceptor. This transport should be minimized as much as possible. It is believed that one effect of polishing both surfaces 38, 44 of the shield 30 is a minimization or at least a substantial reduction in the thermal interaction between the heat sensor 24 and shield 30 and between the shield 30 and the susceptor 12. The thinness of the wall 48 decreases the thermal mass of the shield so that it quickly settles to some equilibrium temperature between the temperatures of the heat sensor and of the susceptor 12.

As noted above, the shield wall 48 of the heat shield 30 has a generally conical shape which, in the illustrated embodiment, is angled at an angle of 45° with respect to the central axis of the heat shield 30. It is recognized that other shapes such as a parabolic shape may also be utilized. In general, dish or concave shapes which enhance the collection and redirecting of heat emitted from the substrate 10 to the heat collector 36 of the heat sensor 24 are preferred.

In the illustrated embodiment, the heat shield wall 48 has an outer diameter of 0.350 inches (8.89 mm) and the susceptor channel 42, within which the heat sensor 24 is received, has a diameter of 0.391 inches (9.93 mm). In general, it is preferred that the susceptor channel 42 and the heat sensor 24 be as small as possible so as to minimize any uneven heating of the substrate 10 by the susceptor 12. In addition, reducing the size of the heat sensor improves its response time.

The heat shield 30 is preferably formed by machining. After forming the exterior surface 44, the partially formed heat shield is secured by a suitable female jig to permit the interior surface 38 to be formed. It is recognized that other techniques may be used. For example, the very thin wall 48 of the heat shield can be stamped from a thin, planar sheet of metal. Alternatively, the wall 48 can be cut from the thin sheet and bent and then welded along the resulting seam to form a conical shape. The conical wall 48 may then be welded to the more massive annular stem 51.

The heat collecting member 36 of the illustrated embodiment is in general an annular, cap-shaped member having an orifice 50 (FIG. 4) in the top wall of the heat collector member 36. The end of the sheath 34 containing the thermocouple junction 32 is received within the heat collector member 36. The aperture 50 permits the thermocouple sheath 34 to be brazed to the heat collector member 36. The top of the heat collector 36 is preferably machined flush to remove any excess brazing. The heat collector 36 is painted with a black colored paint such as Plasticoat, HP-11-black, to increase the heat receptivity of the heat collector member 36. In the illustrated embodiment, the heat collector 36 has an outer diameter of 0.064 inches (2.1 mm) and a length of 0.050 inches (1.3 mm). In general, the heat collector 36 should be relatively small for increased responsivity. The heat collector 36 of the illustrated embodiment is formed from an oxygen-free copper. It is recognized of course that the heat collector member 36 may be formed from a variety of other materials, including anodized aluminum. In general, it is preferred that the heat collector member material have high heat conductivity and emissivity.

The annular stem 51 of the heat shield 30 is attached to the exterior of the sheath 34 preferably so that the top surface of the heat collector 36 is recessed slightly, 0.005 inches (125 μm) in the illustrated embodiment, with respect to the top of the heat shield 30, to increase the protection afforded by the heat shield 30. In the illustrated embodiment, the heat shield 30 is attached to the sheath 34 using a 604 VTG silver braze to provide good thermal conductivity and low out-gassing performance. It is recognized, of course, that other methods of affixing one material to another may be utilized as well.

The heat sensor 24 is supported within the susceptor channel 42 by an insulative bracket 52 which, as best seen in FIG. 5, includes a generally upstanding cylindrical portion 54 which has a slot 56 along its length to allow the sheath 34 of the heat sensor 24 to be inserted lengthwise into the bracket 52. A generally arc-shaped base plate 58 has two through holes 60 which permit the bracket 52 to be screwed into the back of the susceptor 12 after the cylindrical portion 54 and attached heat sensor 24 are inserted into the susceptor channel 42. In the illustrated embodiment, the bracket 52 is made of a stainless steel material which has a relatively low heat conductivity. The upstanding portion 54 of the bracket 52 has a relatively long length (0.996 inches (2.53 cm) in the illustrated embodiment) to insulate the base of the heat shield 30 from the susceptor 12 supporting the heat sensor bracket 52. The interior of the central aperture 62 of the bracket 52 has a diameter of approximately 0.063 inches (1.6 mm) in the illustrated embodiment, which is approximately double that of the outer diameter of the sheath 34 to provide further insulation between the bracket 52 and the heat sensor 24. The heat shield 30 has a length of 0.30 inches (7.6 mm) in the illustrated embodiment.

The thermocouple junction 32 of the illustrated embodiment is a chromel-alumel alloy thermocouple, ungrounded junction, which is sold under the trademark Omega, Model No. K. The sheath 34 of the illustrated embodiment has an outer diameter of 0.032 inches (0.81 mm) and is made of stainless steel. It is recognized of course that other types of heat sensor elements may be used, such as other types of thermocouples or a resistive type heat sensor element, in place of a thermocouple.

The sheath 34 provides further protection for the thermocouple from RF, plasma and other noise sources. The thermocouple junction and the thermocouple lead wires 64 (FIG. 3) are physically insulated from the thermocouple sheath 34 by an MgO powder which is packed into the sheath. Attached to the ends of the two thermocouple wires emerging from the end of the sheath 34 is a two pin connector 66 (FIG. 6) which is attached to the bottom end of the sheath 34 by shrink tubing. An aluminum/epoxy filled transition element 68 is silver brazed to the sheath 34 to provide a vacuum tight seal to sheath 34.

Referring now to FIG. 7, the heat sensor 26 for measuring the temperature of the shield 20 (FIG. 1) is constructed substantially similarly to the susceptor heat sensor 24 described above. However, rather than being mounted to the susceptor, the heat sensor 26 for heat shield 20 is attached to a bottom corner frame member 70 of the processing chamber. The heat sensor 26 is supported by an insulative bracket 72 which passes through an aperture 74 through the frame member 70. The bracket 72 has a fixed collar 76 which supports the bracket 72 on the top surface of the frame member 70. The bracket 72 is secured to the frame member 70 by a hexnut 78. A washer/O-ring assembly 80 interposed between the hexnut 78 and the lower surface of the chamber member 70 seals the connection.

Figure 8:
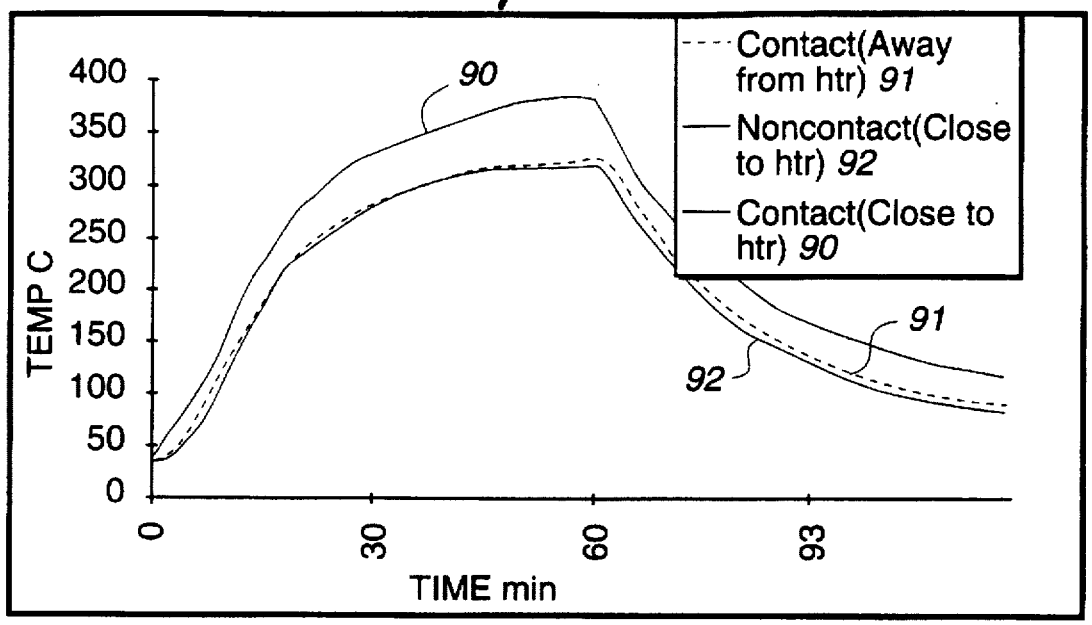
FIG. 8 is a graph depicting temperature measurements of the shield of the chamber of FIG. 1.

FIG. 8 is a graph of data taken by various sensors in an experiment to demonstrate the efficacy of the sensor heat shield 30 of the heat sensor 26 for measuring the temperature of the chamber shield 20. Line 90 represents data outputted by a traditional contact type thermocouple which for purposes of comparison was installed on the chamber shield 20 approximately one inch away from the cartridge heaters. Also, a traditional contact type thermocouple was installed on the outside surface of the chamber shield to provide what is believed to be the most accurate measurement for purposes of comparison. However, as explained above, such a placement of a heat sensor is normally not practical in a deposition chamber. The data provided by this outside surface thermocouple is represented by line 91 and is considered to be the "true" temperature of the shield. Finally, the data provided by the heat sensor 26 of the illustrated embodiment is represented by line 92. For purposes of experimentation, the susceptor 12 was removed to eliminate it as a source of heat.

As shown in FIG. 8, the temperatures measured by the contact type thermocouple positioned close to the cartridge heaters (line 90) showed a substantial offset from the shield temperatures measured by the contact type thermocouple (line 91) which was positioned away from the cartridge heaters. Thus, it is readily apparent from line 90 that the heat emitted by the cartridges adversely affected the accuracy of the temperature measurements. In contrast, the temperature measurements taken by the heat sensor 26 as represented by line 92 show very close agreement with the temperature measurements taken by the heat sensor positioned away from the cartridge heaters as represented by the line 91. Thus, FIG. 8 shows that the heat shield 30 of the heat sensor 26 of the illustrated embodiment is very effective in reducing the adverse effect of heat emitted by a non-workpiece source, here the cartridge heater. Therefore, direct measurement by the heat sensor 26 is satisfactory for this application.

Figure 9:
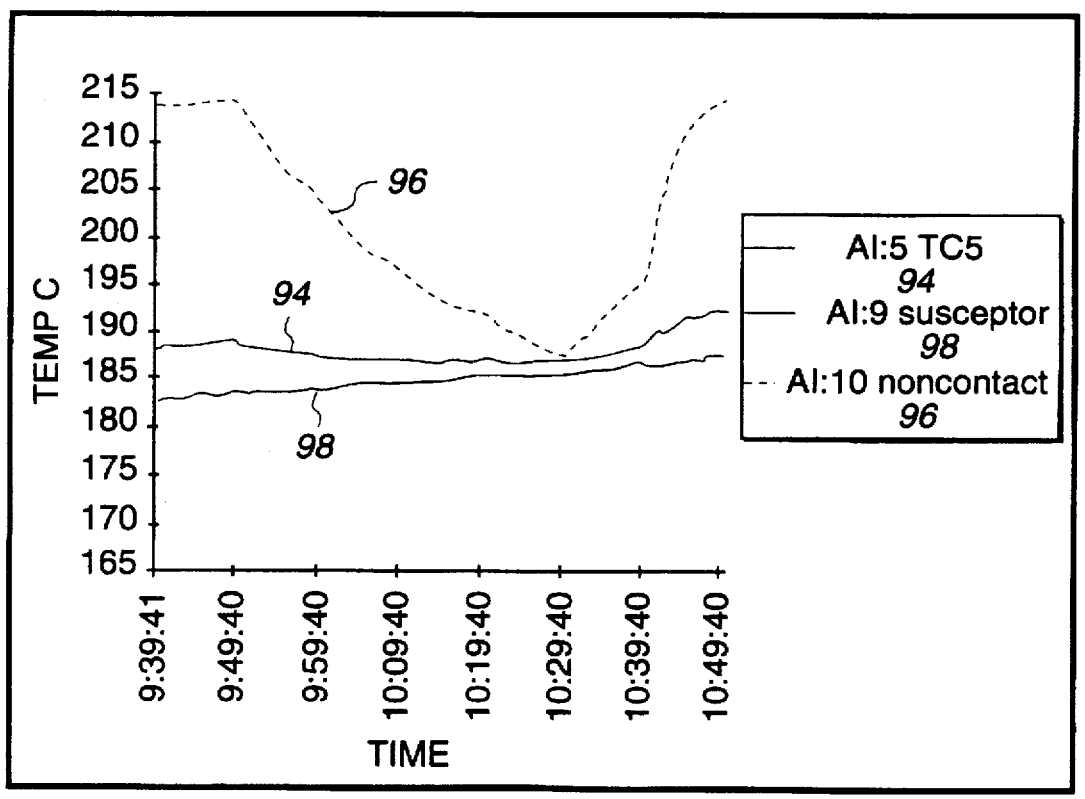
FIG. 9 is a graph of temperature measurements of the substrate and susceptor of the chamber of FIG. 1.

FIG. 9 compares temperature measurements of the substrate 10 taken by the heat sensor 24, as represented by line 94, to the temperature measurements of the substrate 10 taken by a contact type thermocouple physically installed on the substrate, as represented by the line 96. A third line 98 represents temperature measurements of the susceptor 12.

Initially (at time 9:39:41), the substrate temperature is higher than that of the susceptor. At that time, the substrate 10 is located 1.0 inch above the susceptor. Ten minutes later (at time 9:49:40), the susceptor is raised so that the susceptor is in direct physical contact with the substrate. As a consequence, the temperature of the substrate 10 starts to cool as shown in FIG. 9. Forty minutes later (at time 10:29:40), the temperature of the substrate 10 starts rising since it is heated by the susceptor and secondarily by the shield 20. Another ten minutes later (at time 10:39:40), the susceptor is lowered one inch below the substrate 10.

The heat sensor 24 is heated from all directions by the susceptor 12 and the substrate 10. Hence, as shown in FIG. 9, the temperature of the susceptor 12 (as represented by line 98), has an effect on the temperature measurements of the temperature sensor 24 as represented by the line 94. However, it is seen that the shape of the line 94 is substantially related to the shape of the line 96 representing the "actual" temperature of the substrate 10. Thus, it is clear that the heat shield 30 is effective in substantially reducing the effect of the susceptor on the temperature measurements of the substrate 10 by the heat sensor 24.

Figure 10:
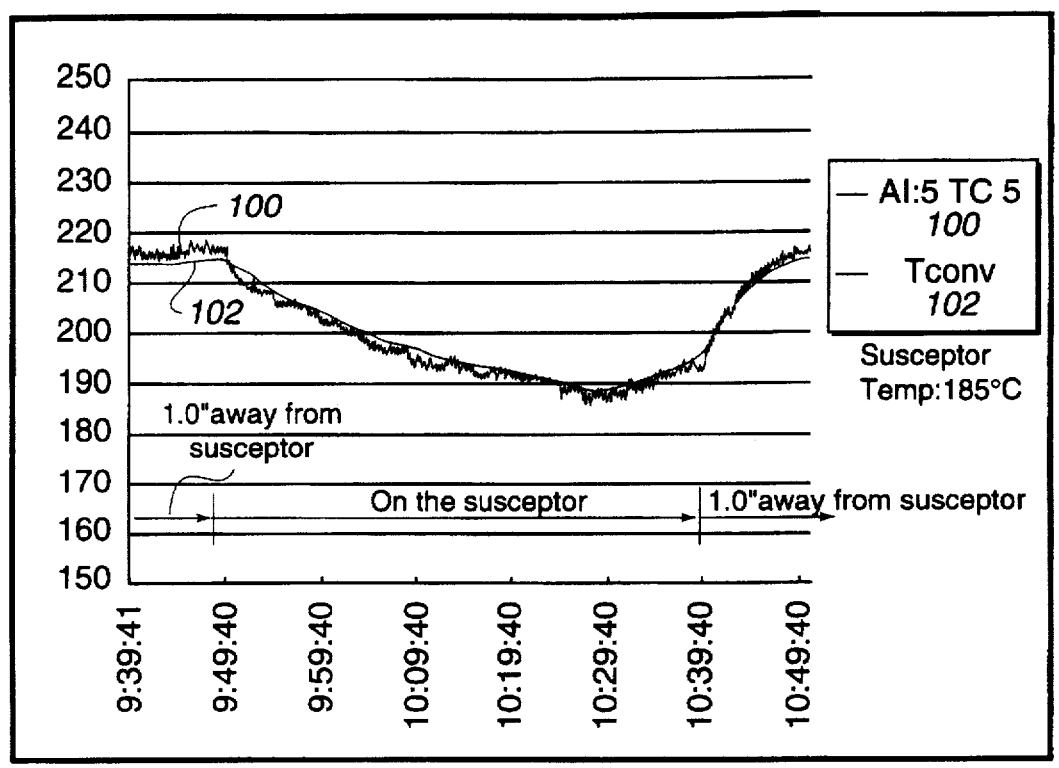
FIG. 10 is a graph depicting calibrated temperature measurements of the substrate with a cold susceptor.
Figure 11:
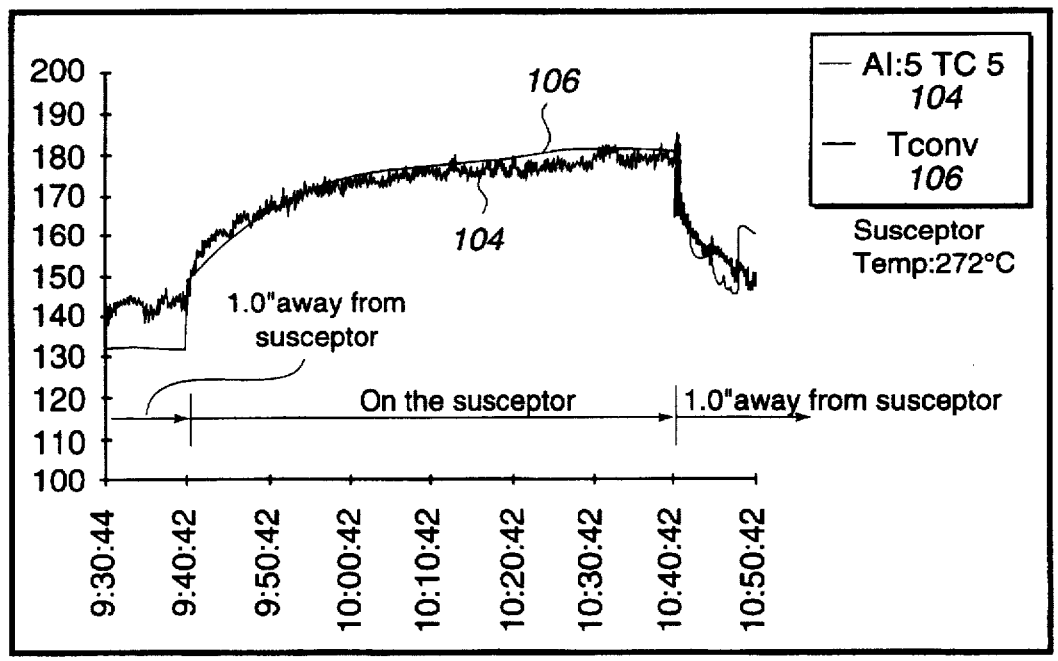
FIG. 11 is a graph depicting temperature measurements of a substrate placed on a hot susceptor.

By properly calibrating the heat temperature data received from the heat sensor 24, the effect of the susceptor temperature on the substrate temperature measurements can be further reduced as shown in FIGS. 10 and 11. To calibrate the apparatus, the following equation performed by a calibrator 120 (FIG. 14) has been used:

$$T_{conv} = (T - T_{sus}) \times C + F(T_{sus})$$

where $T_{conv}$ is the calibrated substrate temperature, T is the temperature read out from the heat sensor 24, $T_{sus}$ is the susceptor temperature sensed by a thermocouple 122 coupled to the susceptor 12, and F ($T_{sus}$) is a value determined as a function of susceptor temperature. As indicated by the above equation, in order to reduce or eliminate the effect of susceptor temperature, the susceptor temperature $T_{sus}$ is subtracted out of the temperature data provided by the heat sensors. Secondly, in order to compensate for an offset caused by the susceptor temperature, the value F ($T_{sus}$) is added. Finally, in order to scale the magnitudes of the values (T-$T_{sus}$) and F ($T_{sus}$), the quantity (T-$T_{sus}$) is multiplied by the constant C.

The function F ($T_{sus}$)=77.72 $e^{0.004508 \times T_{sus}}$ and the constant C=7.0 have been empirically determined for the susceptor temperatures in centigrade depicted in FIGS. 10 and 11. Line 100 of FIG. 10 represents the calibrated temperature measurement data provided by the heat sensor 24 when the substrate 10 is brought into contact with a cold (185° C.) susceptor. Line 100 shows excellent agreement with the actual temperature of the substrate 10 as represented by the line 102. Moreover, it is seen that the temperature measurements taken by the temperature sensor 24 remain in very good agreement with the actual temperatures of the substrate even when the substrate is one inch away from the heat sensor 24 and the susceptor as represented by time intervals 9:39:41–9:49:40 and 10:39:40–10:49:40.

The calibrator 120 preferably includes an analog to digital converter for converting the analog temperature signals from the temperature sensors to digital temperature data. The solutions to the above described calibration formulas are preferably obtained by a suitably programmed workstation or other general purpose computer which is used to control the semiconductor processing system or subsystem as a whole.

Figure 12:
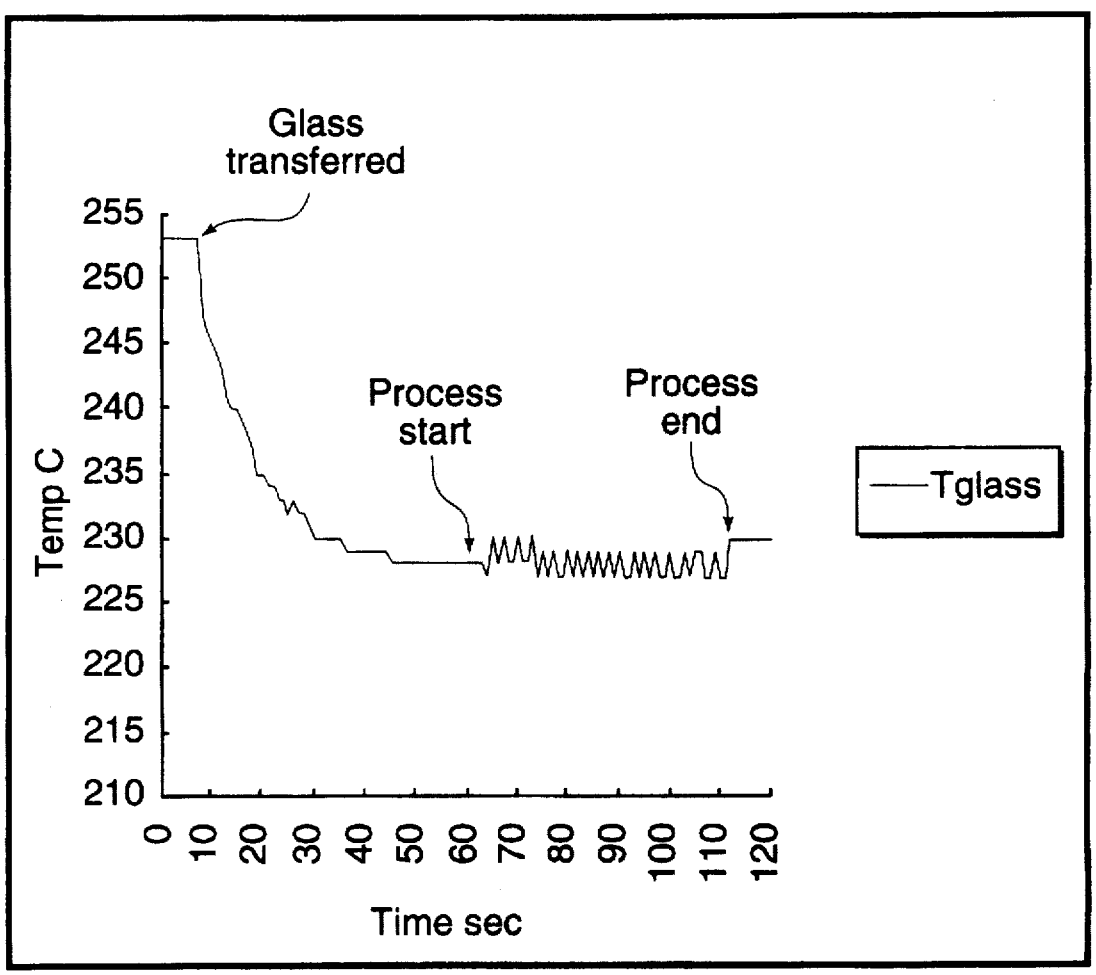
FIG. 12 is a graph depicting temperature measurements of a substrate during processing.

FIG. 11 compares temperature measurements taken by the heat sensor 24 as represented by line 104 to actual temperatures of the substrate 10 as represented by line 106 as the substrate 10 is brought into contact with a heated susceptor (272° C.). FIG. 12 shows the quick response (within one second) of the heat sensor in accordance with the present invention during processing. During the first ten seconds, the substrate is transferred into the processor chamber and is positioned one inch above the susceptor. Once placed upon the susceptor, the substrate starts cooling (or sometimes heating) and subsequently reaches thermal equilibrium. At that point, processing begins which creates a high noise environment.

Figure 13:
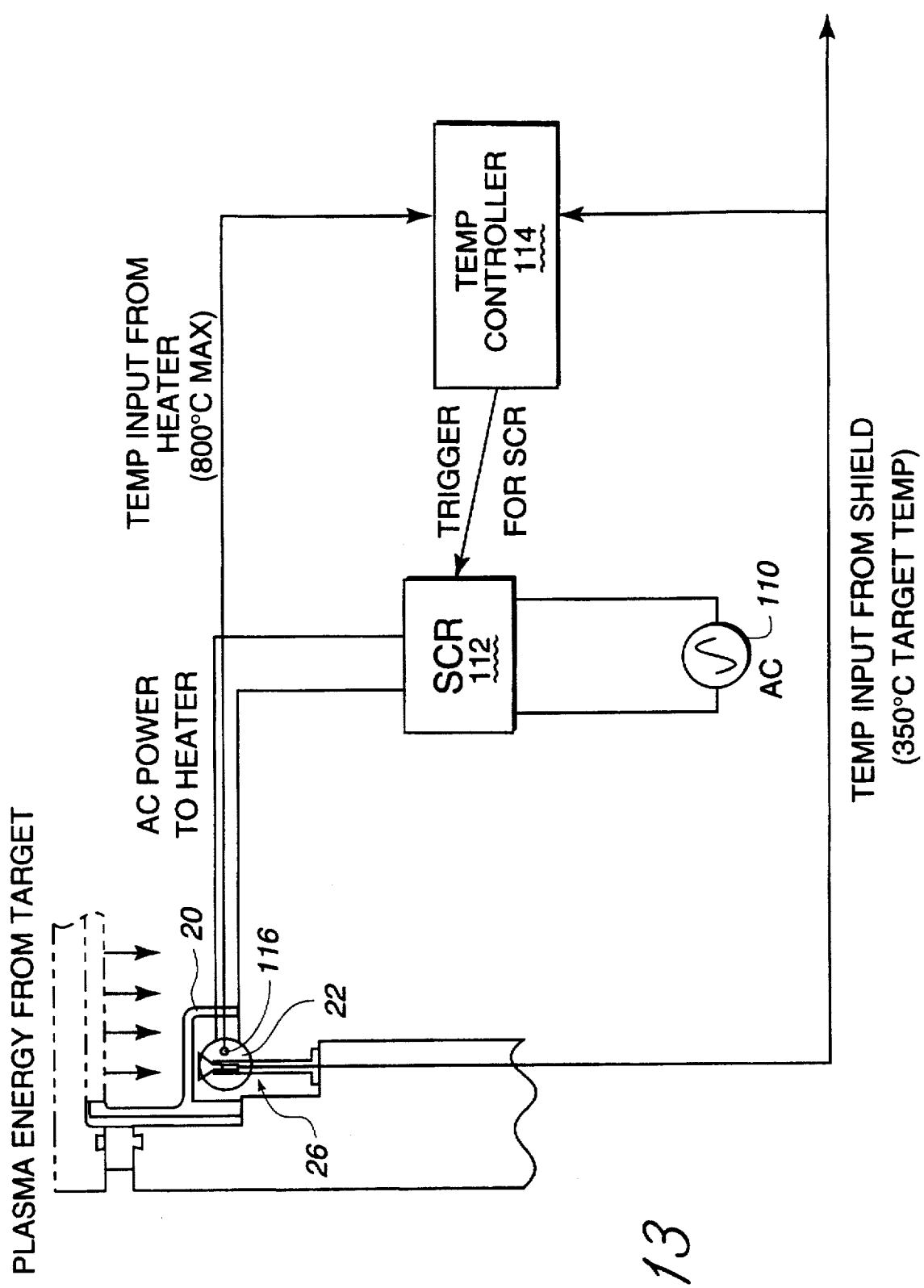
FIGS. 13 and 14 are schematic representations of the temperature control systems for the shield and substrate, respectively, of the chamber of FIG. 1.

FIG. 13 is a schematic representation of the temperature control system for the shield 20 and the cartridge heater 22 of FIG. 1. The temperature control system includes an AC power source 110 which is coupled by an SCR (silicon controlled rectifier) 112 to the cartridge heater 22 which is a resistive type heater. The control input (referred to as the "trigger") for the SCR 112 is controlled by a controller circuit 114 which monitors the temperatures of both the shield 20 and the heater 22. The temperature of the cartridge heater 22 is sensed by a thermocouple 116, the output of which is coupled to an input of the controller 114. In a similar manner, the temperature of the shield 20 is sensed by heat sensor 26 as described above, which is also coupled to an input of the controller 114.

During various portions of the overall film deposition process, the shield is heated by the cartridge heater 22 up to a particular temperature and is maintained at that target temperature for a predetermined length of time. For example, in the illustrated embodiment, the shield 20 is preferably maintained at a temperature of approximate 450° C. during bake out and is preferably maintained at a temperature of 300° C. during sputtering. However, because the thermal mass of the shield 20 is relatively large, the temperature of the shield rises relatively slowly. Conversely, the temperature of the heater 22 rises much more quickly than that of the shield 22.

In order to prevent damaging the heater 22 by overheating the heater while the temperature of the shield 20 rises to its target temperature, the temperature of the heater 22 is usually limited to a predetermined maximum, which, in the illustrated embodiment is 800° C. Thus, the controller 114 preferably triggers the SCR 112 in such a manner as to heat the shield 20 as rapidly as possible to its target temperature and maintain it at that target temperature without overheating the cartridge heater 22 beyond its maximum temperature. In addition, during the sputtering process, additional heat is typically transferred to the shield 20 by the plasma generated during the sputtering. Accordingly, the controller circuit 114 should reduce the temperature of the cartridge heater 22 during sputtering to maintain the shield temperature at its target temperature. In the illustrated embodiment, the controller is implemented with a cascade controller, Model 988, manufactured by Watlow Controls of Winona, Minn. Such cascade controllers are well known in the art and typically utilize primary and secondary control loops. It is recognized of course that other types of controller circuits may be used and that power control devices other than SCR's may be used as well.

Figure 14:
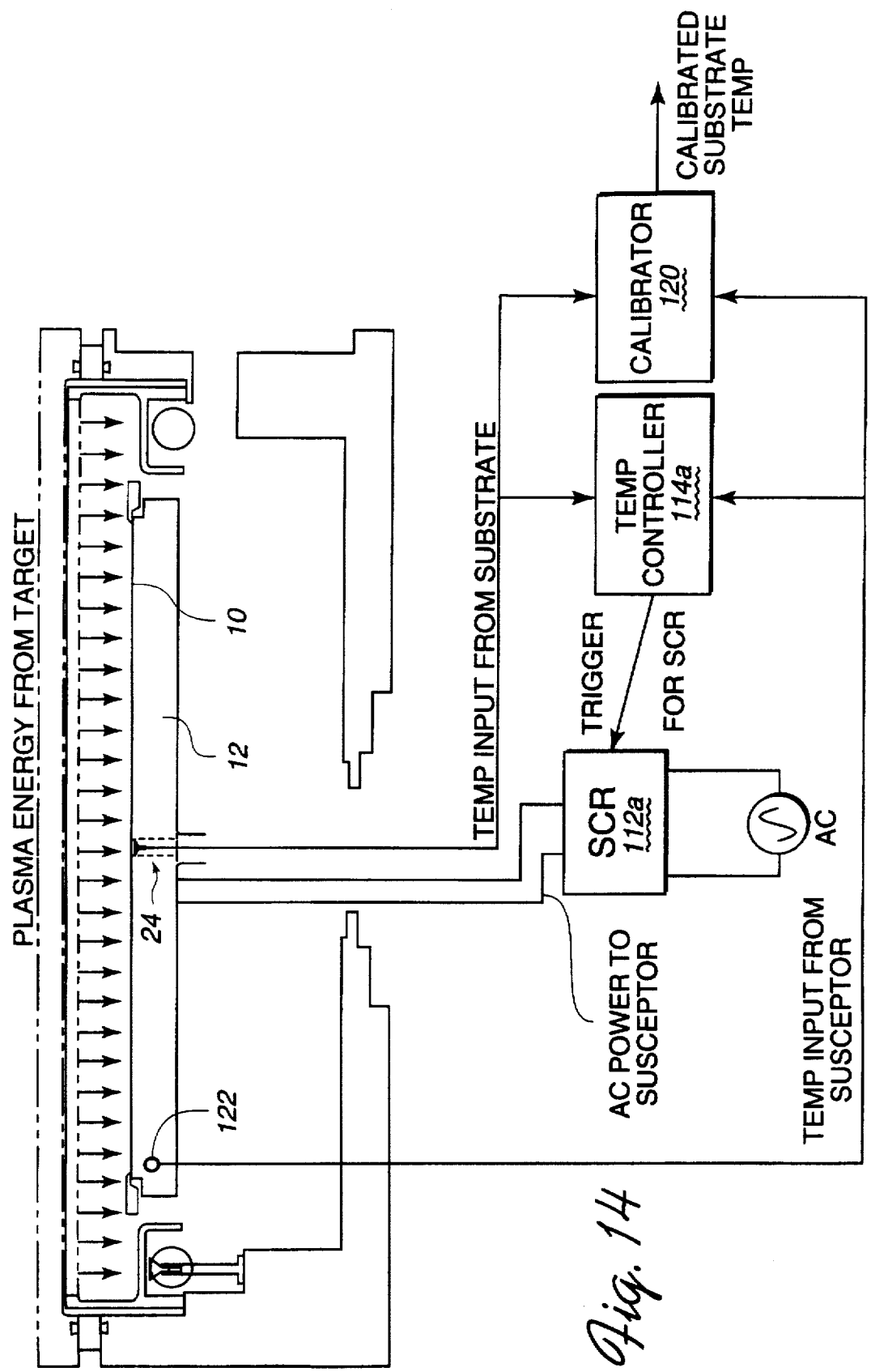

FIG. 14 is a schematic representation of the temperature control system for the substrate 10 and the susceptor 12 of FIG. 1. In a manner similar to that of the control system of FIG. 13 described above, a cascade-type controller 114a monitors the temperature of the substrate 10 as indicated by the heat sensor 24 and triggers an SCR 112a to heat resistive type heaters (not shown) within the susceptor 12 to maintain the substrate 10 at the target temperature. Before sputtering begins, the substrate 10, in the illustrated embodiment, is maintained at a temperature of 200° C. Once sputtering begins, however, additional heat will be transferred to the substrate by the plasma. Accordingly, the controller 114a should decrease the temperature of the susceptor to minimize the temperature increase of the substrate.

In the illustrated embodiment, the temperature signals provided by the temperature sensors are utilized directly by the temperature controllers 114 and 114a. It is recognized that improved temperature control of the substrate 10 and the shield 20 might be achieved by suitably calibrating the measured substrate and shield temperatures before the substrate and shield temperatures are input by the controllers 114 and 114a.

It is seen from the above that the present invention provides an improved temperature measuring system in which a heat shield deflects heat emitted from unwanted sources away from the temperature sensing element to improve the accuracy of temperature measurements in high temperature and other environments. In addition, because the heat shield preferably has a low thermal mass, the responsivity of the sensor is significantly improved.

It will, of course, be understood that modifications of the present invention in its various aspects can be achieved by those skilled in the art. For example, although various dimensions and materials have been disclosed, it should be appreciated that other sizes, shapes and materials may also be utilized. Also, a heat sensor in accordance with the present invention may be a contact-type sensor as well as a non-contact sensor as described herein.

Other embodiments are also possible, their specific designs depending upon the particular application. As such, the scope of the invention should not be limited by the particular embodiments herein described but should be defined only by the appended claims and equivalents thereof.

What is claimed is:

1. A temperature sensing apparatus for measuring the temperature of a workpiece adjacent to an object, comprising:

a heat sensor element positioned to receive radiation emitted from the workpiece, said heat sensor element having an output corresponding to the temperature of said workpiece; and a heat shield disposed between said heat sensor element and said object, said heat shield substantially thermally isolated from said heat sensor element and from said object, said heat shield having a reflective surface positioned to reflect thermal radiation emitted from the object away from the heat sensor element.

2. The sensor of claim 1 wherein said reflective surface has a smoothness of 2 Ra or less.

3. The sensor of claim 1 wherein said heat shield is a thin wall having said reflective surface on the exterior of the thin wall and a second reflective surface on the interior of the thin wall.

4. The sensor of claim 3 wherein said thin wall has a thickness of approximately 0.2 mm.

5. The sensor of claim 3 wherein said thin wall has a thickness of no more than approximately 0.4 mm.

6. A temperature sensing apparatus for measuring the temperature of a workpiece adjacent to an object, comprising:

a heat sensor element positioned to receive radiation emitted from the workpiece, said heat sensor element having an output corresponding to the temperature of said workpiece; and a heat shield disposed between said heat sensor element and said object, said heat shield having a reflective surface positioned to reflect thermal radiation emitted from the object away from the heat sensor element; and a calibrator for calibrating said heat sensor element and producing a calibrated temperature in accordance with the following relationship:

$$T_{conv} = (T - T_{obj}) \times C + F(T_{obj})$$

where $T_{conv}$ is the calibrated temperature, T is the temperature read out from said heat sensor element, $T_{obj}$ is the measured object temperature, C is an empirically determined constant and $F(T_{obj})$ is a value determined as a function of object temperature.

7. The sensor of claim 1 wherein the heat shield is conical in shape.

8. The sensor of claim 1 wherein the heat shield is concave in shape.

9. The sensor of claim 1 wherein the sensor element is a thermocouple.

10. The sensor of claim 1 wherein the object is a susceptor.

11. The sensor of claim 1 wherein the object is a thin film deposition chamber shield.

12. The temperature sensing apparatus of claim 6 wherein the object is a susceptor and the function $F(T_{obj}) = 77.72 \, e^{0.004508 \times T_{obj}}$ and the constant $C = 7.0$.

13. A system for controlling the temperature of a substrate, comprising:

a susceptor positioned to heat the substrate and having a central aperture;

a temperature controller having an output to said susceptor;

a heat collector positioned within the central aperture for collecting heat from the substrate;

a thermocouple positioned adjacent the heat collector for sensing the heat collected by the heat collector, said thermocouple having an output connected to an input of said susceptor to control the temperature of the substrate;

a thin-walled, conical heat reflector positioned between the thermocouple and the susceptor, said reflector having an outer mirror-like reflective surface positioned to reflect radiation emitted from the susceptor away from the thermocouple and having an inner mirror-like surface shaped and positioned to reflect radiation emitted from the substrate toward the heat collector, said heat reflector substantially thermally isolated from the susceptor and from the heat collector.

14. A method of sensing the temperature of a workpiece, comprising:

sensing radiation emitted from the workpiece with a heat sensor element, said heat sensor element having an output corresponding to the temperature of said workpiece; and reflecting radiation emitted from an object adjacent to the workpiece away from the heat sensor element with a reflective heat shield, said reflective heat shield substantially thermally isolated from said object and from said workpiece.

15. A method of sensing the temperature of a workpiece, comprising:

sensing radiation emitted from the workpiece with a heat sensor element, said heat sensor element having an output corresponding to the temperature of said workpiece;

reflecting radiation emitted from an object adjacent to the workpiece away from the heat sensor element with a reflective heat shield; and calibrating the heat sensor element in accordance with the following relationship:

$$T_{conv} = (T - T_{obj}) \times C + F(T_{obj})$$

where $T_{conv}$ is the calibrated temperature, T is the temperature read out from the heat sensor element, $T_{obj}$ is the measured object temperature, C is an empirically determined constant, and $F(T_{obj})$ is a value determined as a function of object temperature.

16. A method of sensing the temperature of a substrate, comprising:

sensing heat emitted by the substrate with a heat sensor element, said heat sensor element having an output corresponding to the temperature of said substrate; and reflecting heat emitted by a susceptor away from the heat sensor element with a thin-walled shield, said thin-walled shield substantially thermally isolated from said substrate and from said heat sensor element.

17. A temperature measuring system, comprising:

a reflector having a conical wall of a thickness less than about 0.4 mm, and an interior surface and an exterior surface of said conical wall being polished to reflect infrared radiation; and a heat sensor disposed within said reflector within a geometric line of sight of said interior surface, said heat sensor substantially thermally isolated from said reflector and having an output corresponding to the temperature of said interior surface.

18. A temperature measuring system as claimed in claim 17, further comprising an infrared absorptive body in which said heat sensor is disposed and which is exposed to said interior surface.

19. A temperature measuring system as claimed in claim 17, wherein said interior surface and said exterior surface are polished to a smoothness of approximately 2 Ra or less.

20. A temperature measuring system for measuring the temperature of a substrate as claimed in claim 17, further comprising a temperature-controlled body having an aperture therein extending from a principal surface thereof upon which said substrate is placeable, said reflector being disposed in said aperture and said heat sensor being disposed in said aperture between said principal surface and said reflector.

* * * * *